Patented June 19, 1923.

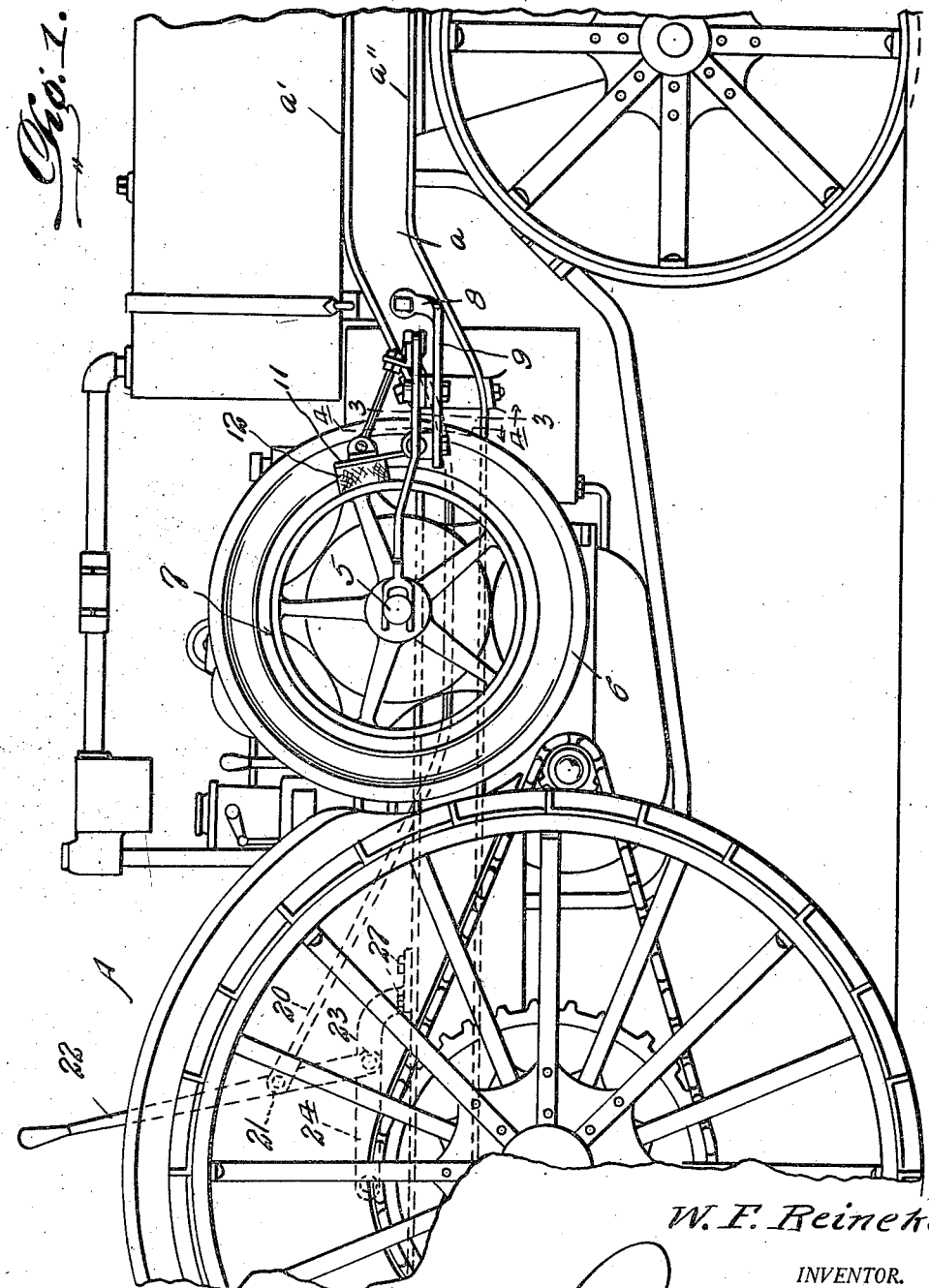

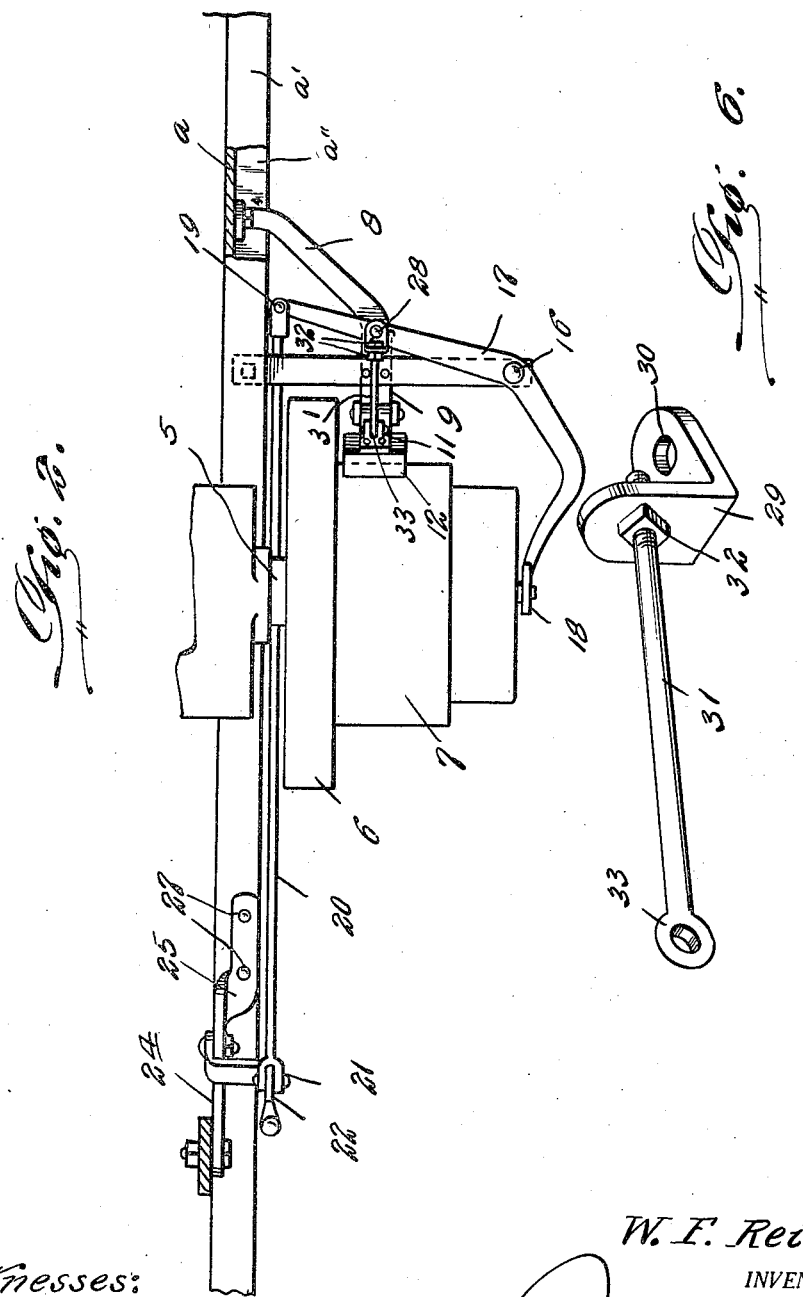

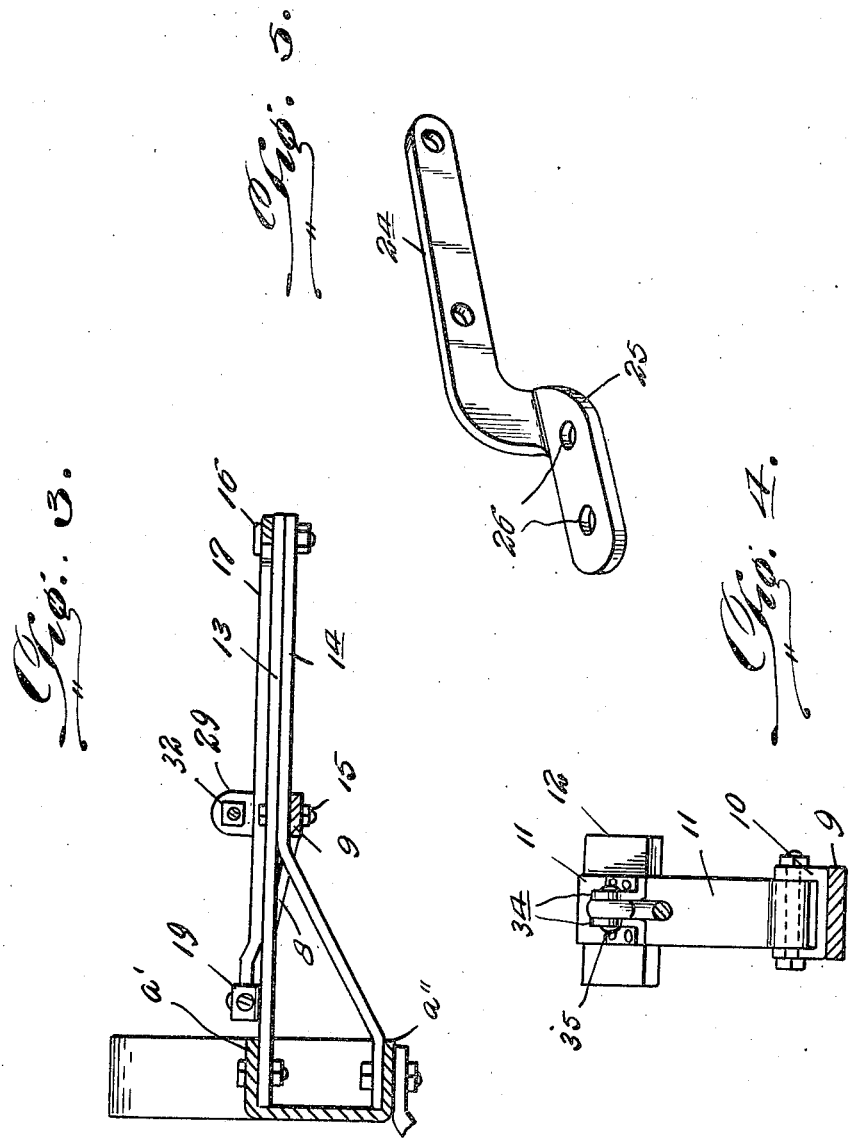

1,459,258

UNITED STATES PATENT OFFICE.

WILLIAM F. REINEKE, OF LAKEFIELD, MINNESOTA.

COMBINED CLUTCH ACTUATOR AND BRAKE.

Application filed November 14, 1922. Serial No. 600,802.

*To all whom it may concern:*

Be it known that I, WILLIAM F. REINEKE, a citizen of the United States, residing at Lakefield, in the county of Jackson and State of Minnesota, have invented certain new and useful Improvements in Combined Clutch Actuators and Brakes, of which the following is a specification.

This invention relates to combined clutch actuators and brakes especially adapted for application to tractors of the "Titan" type, whereby the usual power take off pulley provided on the side projecting power shafts on this type of tractor, may be suitably clutched and unclutched from the shaft, and at the same time, motion of the pulley absolutely stopped as soon as the same is unclutched from the shaft.

A further object of the invention is the provision of such a device that may be readily applied to this type of tractor in a novel manner, and without, to any great extent requiring change to the power take off shaft and its pulley.

A still further object of the invention resides in the provision of a combined clutch actuator and brake, wherein the same is simple of construction, substantially inexpensive of manufacture and highly useful of purpose.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1—is a fragmentary side elevational view of a combined conventional form of "Titan," showing my improved device associated therewith.

Figure 2—is a top plan view of my improved device, showing the same in proper position upon the tractor.

Figure 3—is a vertical cross sectional view upon the line 3—3 of Figure 1, and looking forwardly in the direction of the arrows.

Figure 4—is a view similar to Figure 3, and taken upon the line 4—4 of Figure 1, looking forwardly in the direction of the arrows.

Figure 5—is a perspective view of an improved form of bracket, which is riveted or otherwise suitably secured upon the tractor frame, and adjacent the driver's supporting seat for pivotally receiving thereon an operating handle, and Figure 6—is an enlarged perspective view of the connecting rod between the brake shoe and the clutch actuating member.

Having particular reference to the drawings, there is shown a tractor A of the "Titan" type having the usual side projecting power take off shaft 5 with the usual pulley wheel 6, splined or otherwise suitably secured upon this shaft and adapted for operatively connecting to the shaft by the usual form of clutch mechanism (not shown). In the furtherance of my invention, I have provided this pulley wheel 6 with a radially extending relatively large annular brake drum 7.

Bolted, or otherwise suitably secured to the channel iron "*a*" of the tractor frame, and at a point thereon substantially as shown in Figures 1 and 2 is a supporting arm 8, which arm projects outwardly of the iron "*a*" which terminates in a rearward extension 9, to which is secured at the forward end thereof, and adjacent the brake drum a substantially U-shaped bracket member 10. Pivotally secured between the side legs of this U-bracket 10 is the lower end of a brake shoe arm 11, more clearly shown in Figure 4, and carrying at the upper end thereof any desirable form of brake shoe 12 adapted for contacting with the said brake drum 17 in a manner hereinafter more fully described, for stopping the rotation of the pulley wheel 6. Connected to the upper and lower flanges *a'* and *a''* of the channel iron *a* of the tractor frame are upper and lower relatively long laterally projecting arm members 13 and 14 respectively. As shown in Figure 3, these arms are adapted for close contact with each other, and the inner end of the lower arm 14 is so bent as to extend downwardly to position at its extreme inner end portion upon the flange *a''* of the frame iron *a*.

These arms 13 and 14 are rigidly connected together with the portion 9 of the member 8 by a bolt and nut connection 15.

Pivoted to the outer ends of the arms 13 and 14 by a pivot 16, is what may be termed a bell crank 17. The outer end of this bell crank is forked as at 18, which forked end is adapted to engage over an annular groove in the outer end of the power take off shaft 5. The other arm of the bell crank 17 is pivotally connected as at 19, to one end of an operating rod 20, which rod extends rearwardly and is connected as at 21 to a convenient point upon an operating lever 22. This lever 22 is pivoted at its lower end as at 23 to a bracket 24, which extends parallel with the frame iron $a$ and at a point slightly thereabove. One end of this bracket 24 as more clearly shown in Figure 5, has formed thereon a leg or foot portion 25 provided with suitable openings 26, whereby bolts or the like 27 may extend therethrough for rigidly supporting the said bracket 24 in position upon the iron $a$ of the tractor frame.

Pivotally secured as at 28, to the inner arm of the bell crank 17, and at a point in substantial alinement with the brake shoe arm 11 is an angular bracket 29; one leg of which has an opening 30 therein for receiving the pivot 28, the other leg of which is also provided with an opening for receiving the screw threaded end of a relatively short rod 31. The screw threaded end of this rod is adjustably received within the opening in the adjacent leg of the bracket 29, and is secured therein by wedge nuts 32 upon the rod 31 and at opposite sides of this leg of the bracket member. The forward end of the rod 31 is eyed at 33, and is adapted to extend between a pair of angular brackets 34 rigidly secured at the upper end of the brake shoe arm 11 to be pivoted thereto as at 35.

In view of the above description, it will be readily understood that any rearward pull upon the handle lever 22, will occasion a pivotal movement of the bell crank 17, upon its support, in view of the operating rod 20, which movement will occasion a swinging movement to the outer end of the bell crank 17 for consequently an unclutching the pulley wheel 6 from the power take off shaft 5. Simultaneously with the unclutching of the pulley wheel, the brake shoe 12 will be moved forwardly for consequently engaging the surface of the brake drum 7 for positively stopping rotation of the pulley 6.

While it is believed that from the foregoing description, the nature and advantages of the invention will be readily apparent, I desire to have it understood that I do not limit myself to what is hereinshown and described, and that such changes may be resorted to when desired as fall within the scope of what is claimed.

What I claim as new is:—

In combination with a tractor of the type including a side projecting power take off shaft having a pulley wheel thereon adapted to be clutched and unclutched from the shaft, a brake drum associated with the pulley wheel and adapted to rotate therewith, a brake shoe pivotally supported upon the outer free end of an arm that is carried by the tractor frame and adjacent the said brake drum, means positioned at a convenient point upon the tractor for controlling the movement of the brake shoe and means operable simultaneously with the operation of the brake shoe for clutching and unclutching the said pulley from the said power take off shaft.

In testimony whereof I affix my signature.

WILLIAM F. REINEKE.